Sept. 21, 1943.  C. BEST  2,329,975
WEIGHING APPARATUS
Filed April 17, 1940  4 Sheets-Sheet 1

Inventor
Cyril Best
By
Watson, Cole, Grindle & Watson
Attys.

Sept. 21, 1943.  C. BEST  2,329,975
WEIGHING APPARATUS
Filed April 17, 1940  4 Sheets-Sheet 2

Inventor
Cyril Best
By
Watson, Cole, Grindle & Watson
Attys.

Sept. 21, 1943.  C. BEST  2,329,975
WEIGHING APPARATUS
Filed April 17, 1940  4 Sheets-Sheet 4

Inventor
Cyril Best
By
Watson, Cole, Grindle & Watson Attys

Patented Sept. 21, 1943

2,329,975

UNITED STATES PATENT OFFICE 2,329,975

WEIGHING APPARATUS

Cyril Best, Deptford, London, England, assignor to Molins Machine Company, Limited, London, England Application April 17, 1940, Serial No. 330,227
In Great Britain April 27, 1939

12 Claims. (Cl. 265—27)

This invention relates to weighing apparatus and has for its object to provide improved means whereby articles may be automatically delivered to the pan of the apparatus and removed therefrom after the weighing operation has been effected.

In the manufacture of cigarettes by machine it is usual to select single cigarettes at intervals and weigh them individually in order to keep close control over the performance of the machine. It will be clear that, the greater the proportion of cigarettes produced which are tested, the more accurate will be the record of the machine's performance and this in turn involves rapid weighing of the test cigarettes.

In United States patent specification No. 2,091,516 there is described a weighing apparatus comprising a scale pan having means operative to retain an article in the scale pan during a weighing operation, said means being operable by the next succeeding article to be weighed to release the weighed article from the pan. In the construction shown in said specification, the pan consists of one fixed side and one movable side and this movable side is of a flexible nature of such stiffness that a single article (e. g. a cigarette) will remain in the pan, but when a second cigarette passes into the pan the movable side flexes and permits the first article to drop out. Such a construction has proved satisfactory for weighing a certain number of cigarettes per minute, but as it has since become necessary to increase the number of weighings per minute it is found that the device in question is not positive enough in its operation.

The terms "pan" or "scale pan" used herein include any kind of device or support for supporting the article in the weighing apparatus during the weighing operation.

According to the present invention there is provided a weighing apparatus comprising a scale pan and means for positively removing an article therefrom after a weighing operation, and depositing another article into the pan ready for the next weighing operation. The removal of one article and the depositing of another may be effected by a single device, for example, a rotary conveyor provided with means for conveying one article to the scale pan and means for stripping or ejecting another article from the scale pan.

The invention will be more particularly described with reference to the accompanying drawings, in which:

Figure 5 is a section of Figure 3 on the line B—B.

Figure 7 is a further modification.

Like reference numerals refer to like parts throughout the specification and drawings.

Figure 1:
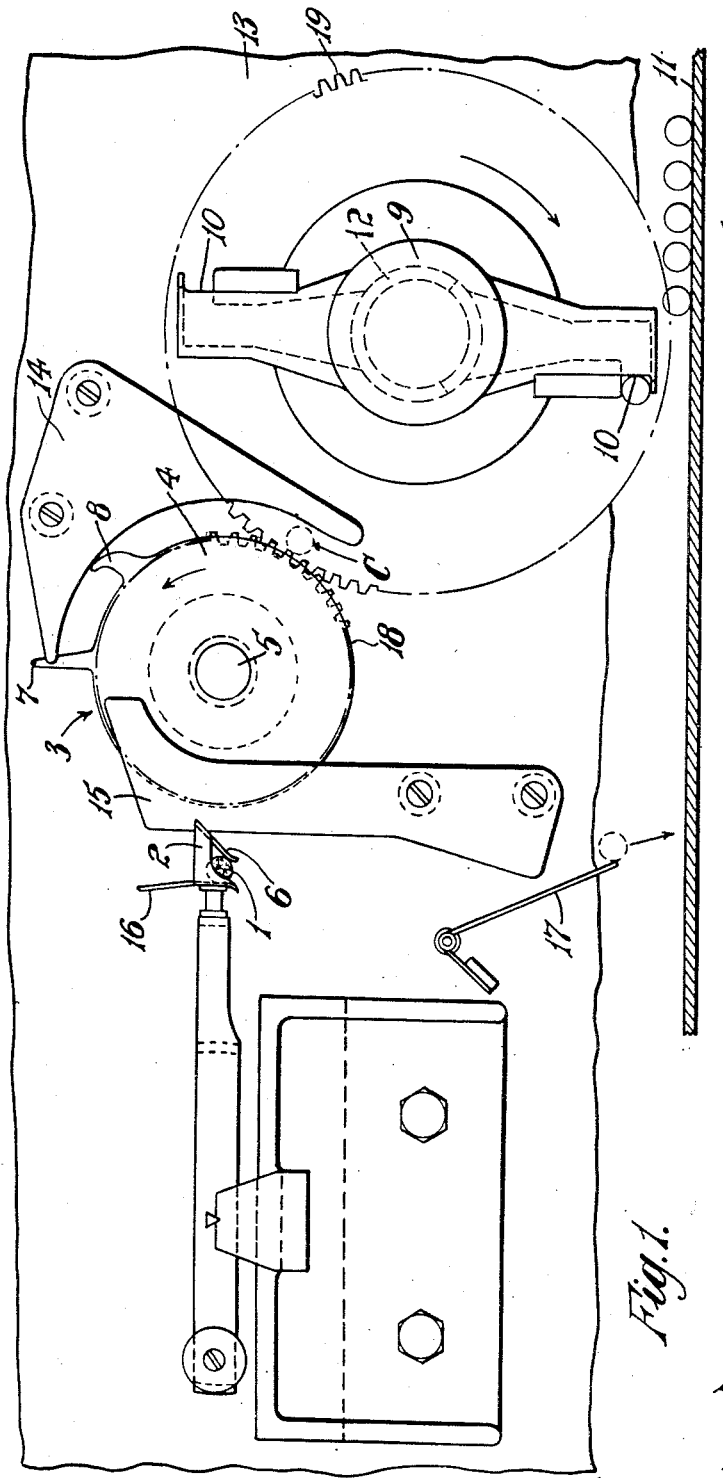
Figure 1 is a front elevation of part of a weighing apparatus for cigarettes having the invention applied thereto.
Figure 2:
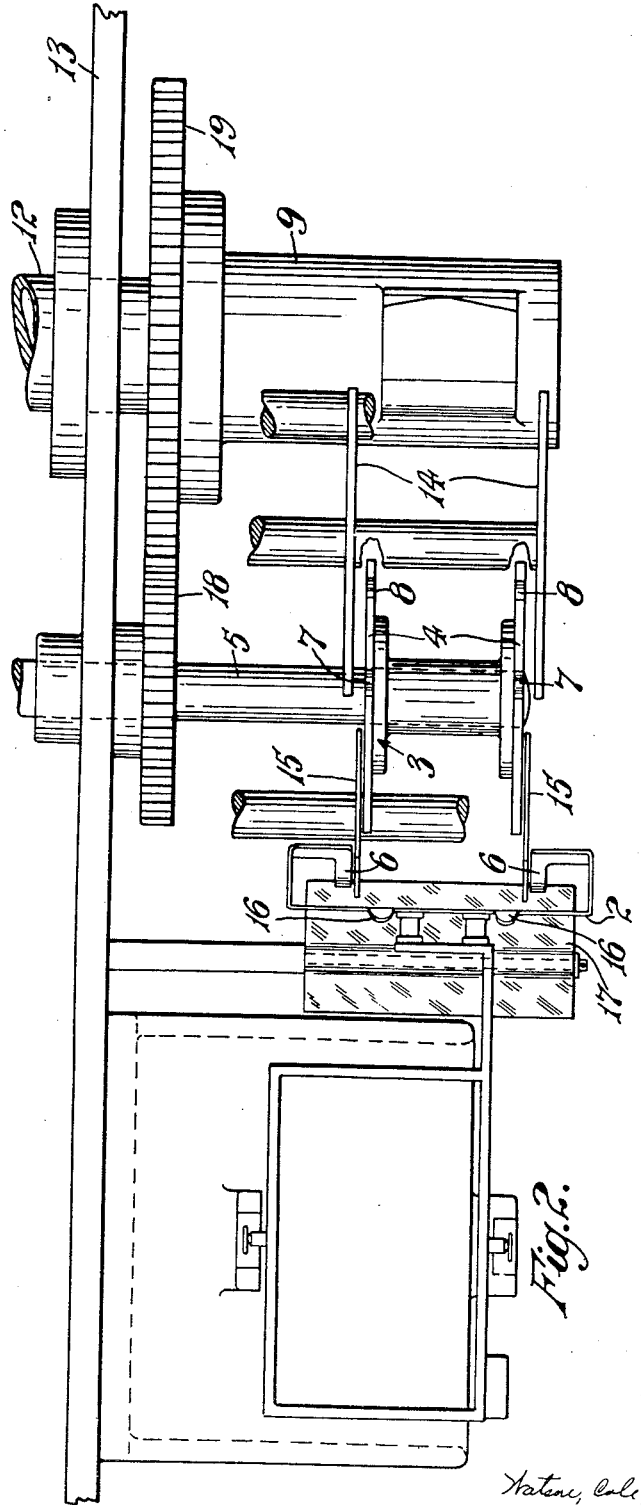
Figure 2 is a plan of Figure 1.

Referring to Figures 1 and 2, single cigarettes 1 are delivered to the pan 2 by a conveyor 3 which consists of a pair of discs 4 spaced apart on a common rotatable spindle 5 at a distance of about two-thirds of the length of a cigarette. The pan is supported in any suitable manner as indicated diagrammatically. A suitable construction is shown in more detail in Figure 3 and described later. The pan comprises a pair of flexible prongs 6, Figure 2, between which the discs 4 are movable and the parts are so arranged that a cigarette carried by the discs as hereafter described may be delivered into the pan so that the back of the pan and the flexible prongs respectively contact with the periphery of the cigarette as shown in Figure 1. The discs are each provided with two radial prongs 7 and 8 on their edges, the prongs being spaced apart on the circumference of the disc as shown and the prong 8 is shorter than the other prong 7. The discs are fixed on the spindle with the prongs in alignment.

The longer pair of prongs constitute means for removing a cigarette from the pan of the weighing apparatus, while the shorter pair constitute conveying means whereby a single cigarette delivered on to the edges of the discs may be retained in position thereon and moved round with the discs.

In operation the discs are rotated in timed relationship with the weighing operations and a cigarette is fed on to the short pair of prongs 8 at each revolution of the discs.

The cigarettes may be supplied to the conveyor by any suitable device which takes them, for example, from the catcher band of a cigarette making machine and delivers them to a position where they may be engaged by the short prongs on the discs.

Such an arrangement is shown in Figures 1 and 2 where a rotatable suction device 9 furnished with suction nozzles 10 is arranged above the catcher band 11 of a cigarette making machine. As the device 9 rotates in the direction of the arrow, the nozzles pick up cigarettes from the band. The device 9 is rotatably mounted on a tubular member 12, Figure 2, which is fixed to the frame 13 of the apparatus and the member 12 has ports cut in it which cause suction to be started and stopped at the proper times in the suction nozzles 10. The member 12 thus constitutes both a support and a valve device. Such constructions are well known and no further description is necessary. The cigarette is transferred from the nozzle 10 to the conveyor 3 at about the position indicated by the reference C, Figure 1. At this position, the prongs 8 of the conveyor which are moving at a slightly greater speed than the nozzle 10 overtake the latter and lift the cigarette therefrom. The suction is cut off by the above-mentioned valve at or before this time. A pair of guides 14 shield the conveyor 3 and prevent accidental displacement of a cigarette carried by the prongs 8.

The longer pair of prongs are leading as the discs 4 rotate and consequently as they move between the prongs 6 of the scale pan they positively move any cigarette in such pan out of the bottom thereof, the prongs 6 of the pan bending under the pressure exerted by the prongs 7 away from the back of the pan to allow this.

While this movement is taking place the shorter pair of prongs deliver another cigarette as described below into the pan where it is retained during the weighing operation by the flexible prongs 6 which move inwards again as soon as the first cigarette has passed out through the bottom of the pan.

In order to facilitate the entry of the cigarette into the pan a pair of fixed guides 15 are arranged near the delivery position. The cigarette eventually engages the guides and rolls down them or is urged to do so by the prongs 8. The guides control the path of the cigarette and ensure satisfactory transfer. As the pan 2 may be moving during this process, further guides 16 are arranged to form in conjunction with the guides 15 a kind of guide channel.

The guides 15 continue downwards and in conjunction with a pivoted flap 17, which may be weighted or sprung, form a passage to guide weighed and discharged cigarettes back to the catcher band 11.

The weighing apparatus is mechanically controlled to effect a given number of weighing operations per minute, for example, it may be constructed and operated in the manner described in British Patent Specifications Nos. 425,721 and 425,722.

The conveyor 3 and suction device are operated in timed relationship with the weighing apparatus by gearing the spindle 5 to the driving mechanism of such apparatus. The spindle 5 has a gear wheel 18 fixed to it which engages with a gear wheel 19 on the suction device 9.

Figure 3:
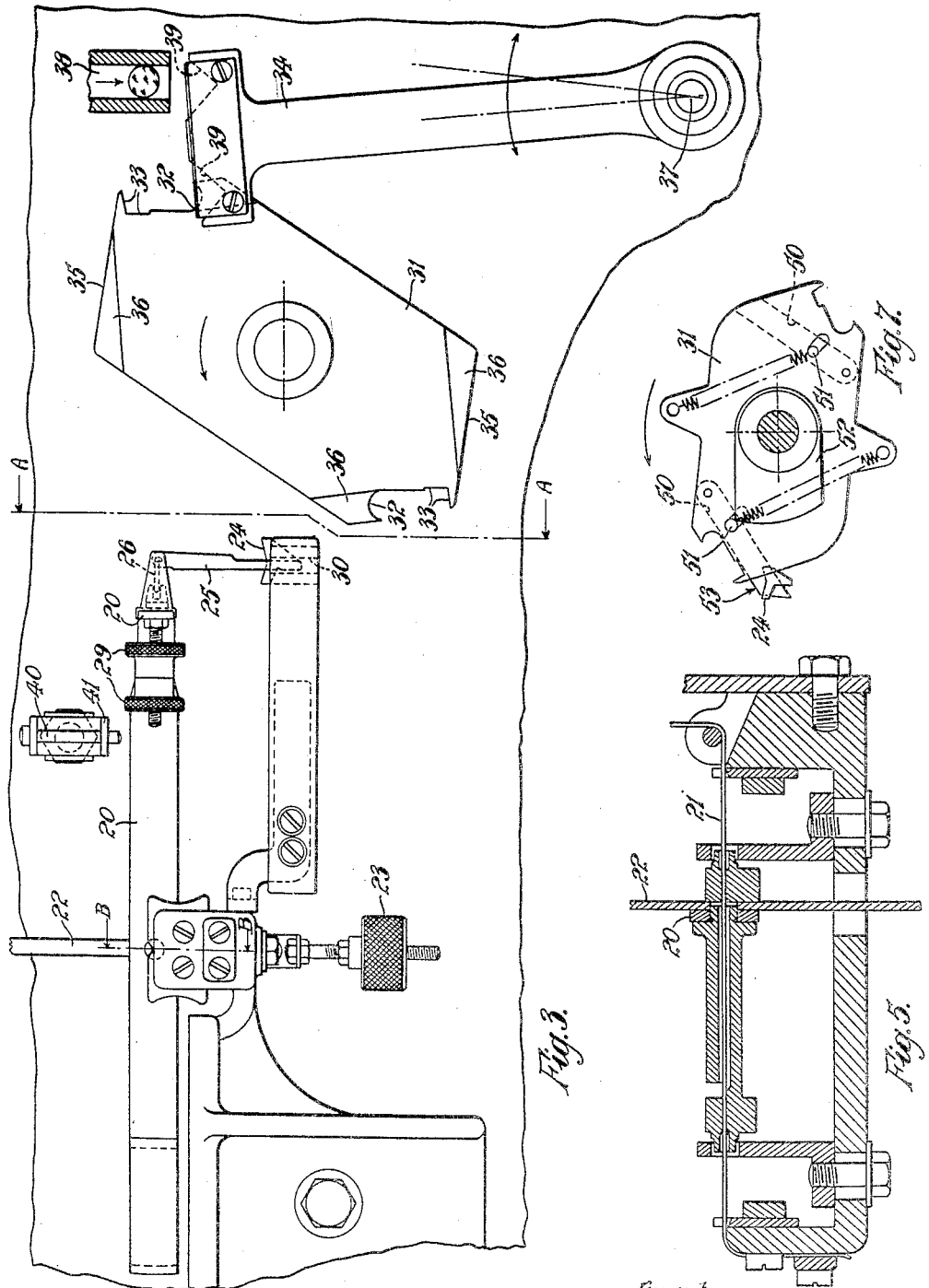
Figure 3 is a front elevation of part of a weighing apparatus showing a modified form of the invention.
Figure 4:
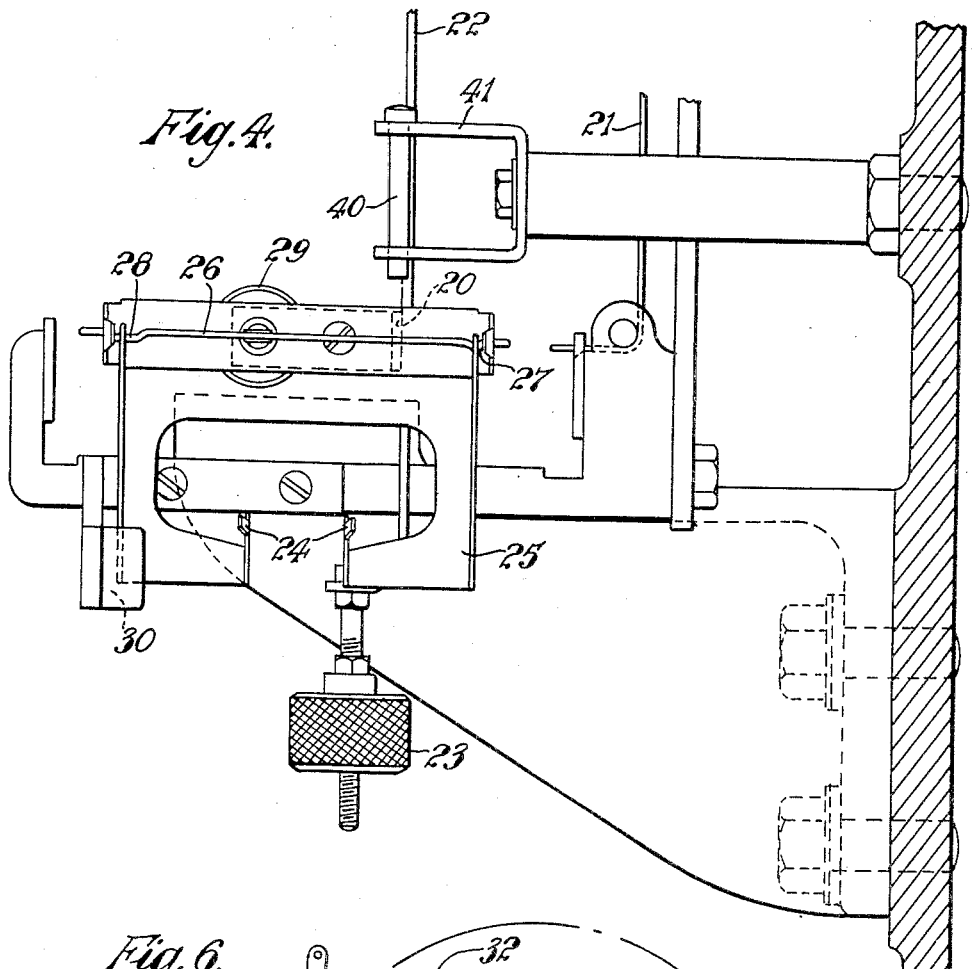
Figure 4 is a sectional end elevation of Figure 3 on the line A—A.

The construction shown in Figures 3 to 5 is more generally suitable for articles, e. g. cardboard containers filled with tablets which are relatively heavy and rigid as compared with cigarettes, and the design of the pan has been modified because such articles may be ejected in a more vigorous manner than cigarettes which are comparatively delicate articles. By eliminating the prongs 6 a more robust and durable pan is obtained.

The weigh-beam 20 consists of a single arm and is suspended on a wire 21 in the manner indicated in Figure 5 and described in detail in British Patent Specification No. 527,983. A pointer 22 is provided and moves over a graduated scale, not shown. The pointer is counter-balanced by an adjustable weight 23.

The scale pan comprises a pair of V shaped supports 24 formed in a pivoted member 25. As the member 25 is made of thin and rather flexible metal the pivot for suspending it consists of a stiff wire 26 which is bent at one suspension point into a V 27, while at the other point it is bent to form an offset piece 28 parallel to the main part of the wire, see Figure 4. This construction reduces friction to the minimum and ensures that the pan will not be accidentally displaced from its proper position but at the same time allows the member 25 to move slightly or flex during the operation of the apparatus.

The end of the beam near the pan is provided with a counterweight comprising two adjustable nuts 29, and when the apparatus is set up these nuts, and if necessary the nut 23, are adjusted until a zero reading is obtained with an article of correct weight on the scale pan.

In order to maintain the pan 24 substantially in the position shown in Figure 3 during the transfer of articles to and from the pan, a grooved guide 30 is provided which surrounds one end of the member 25 and prevents the pan from swinging to any great extent.

The conveyor for transferring the articles comprises a rotary member 31 furnished with grooved portions on its periphery comprising arc shaped recesses 32 for taking the articles from the feeding device and flat sided recesses 33 for transferring the articles to the pan 24. The recesses 33 are slightly deeper than the groove to prevent the articles from bouncing back. The articles are removed by the recesses 32 from a rocking feed member 34, and as the conveyor rotates in the direction of the arrow the article rolls along the groove until it comes to rest in the recess 33. The portion 35 of the rim of the conveyor constitutes a cam which presses against the article already in the pan and ejects it from the V groove thereof. Immediately afterwards the article supported in the recess 33 is stripped therefrom as it comes against the V grooves of the pan. The thrust due to the ejection of an article is taken by the grooved guide 30 as previously mentioned. The conveyor 31 is bevelled at 36 to enable it to pass between the sides of the pan 24 without shock should the latter be moving or vibrating a little.

The feed member is pivoted at 37 and rocked to and fro, as indicated by the arrow, by a cam, not shown. The member is arranged to serve two sets of weighing apparatus, the other set being disposed on the right hand side of the feed member and similar to the set already described. The articles are fed down a chute 38 and fall into V shaped recesses 39 in the feed member. As in the previous example, the parts are all operated in timed relationship.

Figure 7 shows an improved construction of the rotary member 31 which has a smoother action in ejecting the article from the groove of the pan. Instead of the cam portions 35 of the member 31, pivoted pawls 50 are substituted. The arrangement is such that the pawls 50 are in the position shown at the right hand side of Figure 7 until they have been moved below the scale pan; then as the member 31 continues to rotate, the pins 51 on the pawls engage a fixed cam 52, This cam causes a pawl to rise rapidly to the position indicated at the left of the figure and the article is engaged from beneath by the surface 53 of the pawl and is lifted off the pan. Springs 54 are provided to return the pawls to the inner position shown at the right hand side of the figure. In this way the removal of the article is effected without any lateral pressure on the pan.

It may happen that by accident an extremely light container (i. e. one lighter in weight than normally expected) will be fed down the chute 38. As the weighing apparatus is balanced at zero for an article of correct weight it will be apparent that if a very light container is delivered on to the pan 24 the beam will swing vigorously in an anti-clockwise direction and damage may ensue, or the pointer 22 will swing so far as to bring it outside of the scope of the registering devices such as described in British Patent Specification No. 425,722. To prevent this a rider 40 is provided and loosely carried in a bracket 41. The rider is of such weight as to check the beam to the necessary extent, when it meets and lifts the rider, so that the pointer is prevented from passing beyond the normal extreme position. The article will therefore be registered as "very light."

Figure 6:
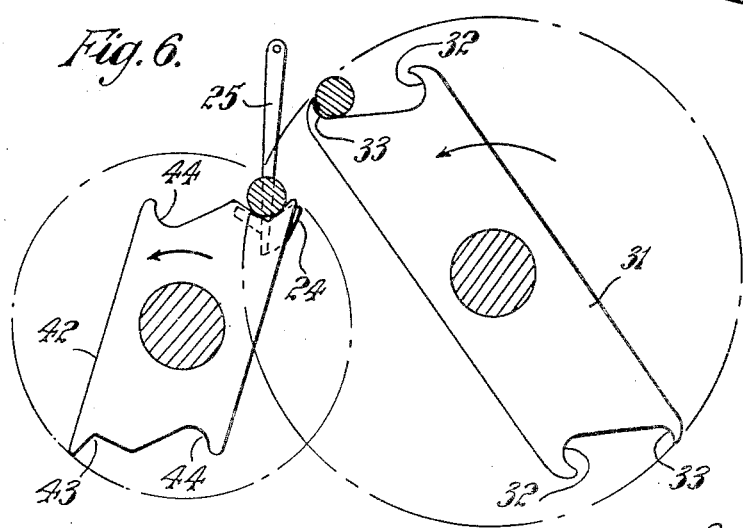
Figure 6 is a modification.

In Figure 6 there is shown diagrammatically a modified form of the transfer conveyor 31 and parts performing the same function are numbered the same as in Figures 3 to 5. In this construction the articles are removed from the pan 24 by another conveyor 42. Both conveyors rotate as indicated by the arrows and the conveyor 42 is timed slightly in advance of the conveyor 31 in order to remove the article in the scale pan before the fresh one is delivered thereto. The conveyor 42 is provided with recesses 43 for removing the article and recesses 44 into which the article rolls as the conveyor rotates. Thus the article is held on the conveyor until the latter has turned about 90° from the position shown when the article falls from the conveyor down a chute or the like.

While the invention has been described in connection with the weighing of single articles, it will be clear that it may be applied to batches of articles such as several cigarettes either loose or enclosed in a packet by suitable construction of the transfer devices. Of course, when a batch comprises loose cigarettes the scale pan and the conveyor pockets will be so dimensioned as to accommodate the greater number of cigarettes.

Further, the source of supply of articles for weighing may be a machine producing such articles, as in the example described, or a magazine of the articles, or they might be fed manually on to the conveyor.

What I claim as my invention and desire to secure by Letters Patent is:

1. In weighing apparatus, a scale pan, members connected with said pan flexibly to engage an article to be weighed, a rotary conveyor for depositing an article in said pan, and prongs on said conveyor to engage and press said article and thereby to positively remove the article from the pan, said members being adapted to flex under the pressure exerted by the prongs on the article.

2. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, the rear wall being arranged to pass inside said position.

3. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and a transfer member movable in timed relationship with the conveyor to remove an article from the receptacle prior to the delivery of a further article to the receptacle.

4. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and an element movable with and disposed in advance of said leading wall to remove an article from the receptacle prior to the delivery of a further article to the receptacle.

5. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and a camlike element movable with and disposed in advance of said leading wall to remove an article from the receptacle prior to the delivery of a further article to the receptacle.

6. In delivery mechanism, a receptacle to receive an article, a conveyor to deliver articles in succession to the receptacle, said conveyor comprising a pocket to carry the articles delivered thereby, the pocket being movable through an arcuate path, while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and a rotatable element movable about an axis disposed below the receptacle and to the opposite side thereof to that at which the center of said arcuate path is located, to remove an article from the receptacle prior to the delivery of a further article to the receptacle.

7. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and a transfer member movable in timed relationship with the conveyor to lift and remove an article from the receptacle prior to the delivery of a further article to the receptacle.

8. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and an element movable with and disposed in advance of said leading wall to lift and remove an article from the receptacle prior to the delivery of a further article to the receptacle.

9. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and a recess formed between said leading and rear walls at a position adjacent to the leading wall to arrest movement of an article in a direction reverse to the direction of movement of the pocket after the article has engaged said leading wall.

10. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, a recess formed between said leading and rear walls at a position adjacent to the leading wall to arrest movement of an article in a direction reverse to the direction of movement of the pocket after the article has engaged said leading wall, and a transfer member movable in timed relationship with the conveyor to remove an article from the receptacle prior to the delivery of a further article to the receptacle.

11. In delivery mechanism, a receptacle to receive an article, a conveyor to deliver articles in succession to the receptacle, said conveyor comprising a pocket to carry the articles delivered thereby, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, a recess formed between said leading and rear walls at a position adjacent to the leading wall to arrest movement of an article in a direction reverse to the direction of movement of the pocket after the article has engaged said leading wall, and a transfer member movable in timed relationship with the conveyor to lift and remove an article from the receptacle prior to the delivery of a further article to the receptacle.

12. In delivery mechanism, a receptacle to receive an article, a conveyor comprising a pocket to deliver articles in succession to the receptacle, the pocket being movable through an arcuate path while delivering articles to the receptacle, said pocket including a leading and a rear wall spaced apart from each other in the direction of movement of the pocket, the outer extremity of said leading wall being at a greater distance from the center of said arcuate path than the outer extremity of the rear wall and arranged to pass through a position to be occupied by an article on the receptacle, and an element disposed in advance of said pocket and movable with and relatively to the pocket to lift and remove an article from the receptacle prior to the delivery of a further article to the receptacle.

CYRIL BEST.